United States Patent
Leinen

(10) Patent No.: US 10,392,785 B2
(45) Date of Patent: Aug. 27, 2019

(54) CONTROL CARTRIDGE DESIGNED AS SCALDING PROTECTION VALVE

(71) Applicant: CERAMTEC GMBH, Plochingen (DE)

(72) Inventor: Josef Leinen, Wittlich (DE)

(73) Assignee: CERAMTEC GMBH, Plochingen (DE)

(*) Notice: Subject to any disclaimer, the term of this patent is extended or adjusted under 35 U.S.C. 154(b) by 313 days.

(21) Appl. No.: 15/313,904

(22) PCT Filed: May 27, 2015

(86) PCT No.: PCT/EP2015/061715
§ 371 (c)(1),
(2) Date: Nov. 23, 2016

(87) PCT Pub. No.: WO2015/181237
PCT Pub. Date: Dec. 3, 2015

(65) Prior Publication Data
US 2017/0145670 A1 May 25, 2017

(30) Foreign Application Priority Data

May 27, 2014 (DE) .................. 10 2014 007 676

(51) Int. Cl.
*G05D 23/13* (2006.01)
*F16K 17/38* (2006.01)
(Continued)

(52) U.S. Cl.
CPC .......... *E03C 1/041* (2013.01); *F16K 11/0787* (2013.01); *F16K 17/386* (2013.01);
(Continued)

(58) Field of Classification Search
CPC .. G05D 23/13; G05D 23/1306; G05D 23/132; G05D 23/1326; G05D 23/134;
(Continued)

(56) References Cited

U.S. PATENT DOCUMENTS

| 5,141,153 A | 8/1992 | Jeffress |
| 5,647,530 A * | 7/1997 | Lorch ............... F16K 17/38 137/625.15 |

FOREIGN PATENT DOCUMENTS

| DE | 3108419 A1 | 9/1982 |
| DE | 4423854 A1 | 1/1996 |
| JP | 59151678 A * | 8/1984 ........... F16K 31/002 |

OTHER PUBLICATIONS

Characteristics Analysis and Testing of SMA Spring Actuator, By Jianzuo Ma et al. Jul. 19, 2013, Advances in Materials Science and Engineering vol. 2013, Article ID 823594. Retrieved from https://www.hindawi.com/journals/amse/2013/823594/.*

(Continued)

*Primary Examiner* — Edward F Landrum
*Assistant Examiner* — Daniel C Comings
(74) *Attorney, Agent, or Firm* — Fitch, Even, Tabin & Flannery, LLP

(57) ABSTRACT

The invention relates to a control cartridge for single-lever mixer taps, comprising a housing in which a ceramic base disk and a rotatable and displaceable ceramic control disk resting on the base disk are situated. An inlet for the cold water and hot water, respectively, and an outlet for the mixed water are situated in the base disk, and the mixed water is diverted in the control disk and leaves the control cartridge via the outlet in the base disk. In order for automatic scalding protection to be integrated into the control cartridge, i.e., for the control cartridge to automatically close in the event of a scalding temperature of the mixed water, according to the invention at least one shape memory alloy (SMA) element is situated on the control disk, and takes on the temperature of the mixed water during operation of the control cartridge, and upon reaching a scalding temperature of the mixed water, expands and hereby automatically moves the control disk into the closed position in which no water arrives at the outlet, and the SMA element is supported on the one hand on the control disk and on the other hand on the housing.

8 Claims, 3 Drawing Sheets

(51) Int. Cl.
*F16K 31/00* (2006.01)
*E03C 1/04* (2006.01)
*F16K 11/078* (2006.01)

(52) U.S. Cl.
CPC ....... *F16K 31/002* (2013.01); *G05D 23/1326* (2013.01); *G05D 23/13* (2013.01); *G05D 23/1306* (2013.01); *G05D 23/1373* (2013.01)

(58) Field of Classification Search
CPC ............ G05D 23/1366; G05D 23/1373; F16K 17/00; F16K 17/38; F16K 31/002
USPC ........................ 236/12.1, 12.11, 12.17, 12.23
See application file for complete search history.

(56) References Cited

OTHER PUBLICATIONS

International Search Report for PCT/EP2015/061715 dated Aug. 20, 2015; English translation submitted herewith (5 pages).
Office Action with Search Report of CN Appln. No. 201580027151.9 dated Aug. 8, 2018 with partial English translation and German translation of the first examination certificate.

* cited by examiner

CONTROL CARTRIDGE DESIGNED AS SCALDING PROTECTION VALVE

CROSS-REFERENCE TO RELATED APPLICATIONS

This application is a U.S. national phase application filed under 35 U.S.C. § 371 of International Application No. PCT/EP2015/061715, filed May 27, 2015, designating the United States, which claims priority from German Patent Application No. 102014007676.8, filed May 27, 2014, which are hereby incorporated herein by reference in their entirety for all purposes.

The invention relates to a control cartridge for single-lever mixer taps, comprising a housing in which a ceramic base disk and a rotatable and displaceable ceramic control disk resting on the base disk are situated. In addition to an open position and a closed position, the control disk has a mixing position. In the open position and the mixing position, water flows through the control cartridge, and in the closed position it does not.

In conventional single-lever mixer taps, valves having ceramic sealing disks (base disk and control disk) are almost exclusively used. In the sanitary fitting sector, these valves are referred to as cartridges or control cartridges. These cartridges are almost always characterized in that ceramic sealing disks are contained in a housing.

The object of the invention is to modify a control cartridge in such a way that automatic scalding protection is integrated, i.e., the control cartridge automatically closes at a defined temperature of the mixed water.

This object is achieved according to the invention by a control cartridge according to Claim 1.

As the result of at least one shape memory alloy (SMA) element being situated on the control disk element, and taking on the temperature of the mixed water during operation of the control cartridge, and upon reaching a scalding temperature of the mixed water, expanding and hereby automatically moving the control disk into the closed position in which no water arrives at the outlet, and the SMA element being supported on the one hand on the control disk and on the other hand on the housing, when the mixed water has a scalding temperature at which a user would be scalded, the SMA element expands and thereby moves the control disk into its closed position. According to the invention, mixed water flows completely around the control disk 4 when the control cartridge is in an open position.

An SMA element is understood to mean a component made of a shape memory alloy. A shape memory alloy is made of the following materials, for example: NiTi, CuZnAl, CuAlNi, FeMnSi, or FeNiCoTi. Whereas most metals always have the same crystal structure up to their melting point, shape memory alloys have two different structures (phases), depending on the temperature. Shape memory alloys (SMA) are also specialized metals which are able to exist in two different crystal structures. They are often also referred to as memory metals. This is based on the phenomenon that they are able to apparently "remember" an earlier shape despite subsequent severe deformation.

The SMA element is preferably an SMA metal sheet or an SMA wire. Metal sheets or wires are to be manufactured in such a way that they require little space in the control cartridge.

In one preferred embodiment, only SMA elements are used which expand with a force of at least 50 N when the scalding temperature is reached. It has unexpectedly been shown that this small force is sufficient to move the control disk in the control cartridges currently in use.

Two or more SMA elements are preferably used. The force on the control disk may thus be increased.

The invention is explained in greater detail with reference to the figures, in which:

FIGS. 1, 3, 4, 5 and 6 each show a section perpendicular to a center axis (see FIG. 8) of a control cartridge, i.e., a top view of the control disk, according to the invention in various positions;

Figure 8:
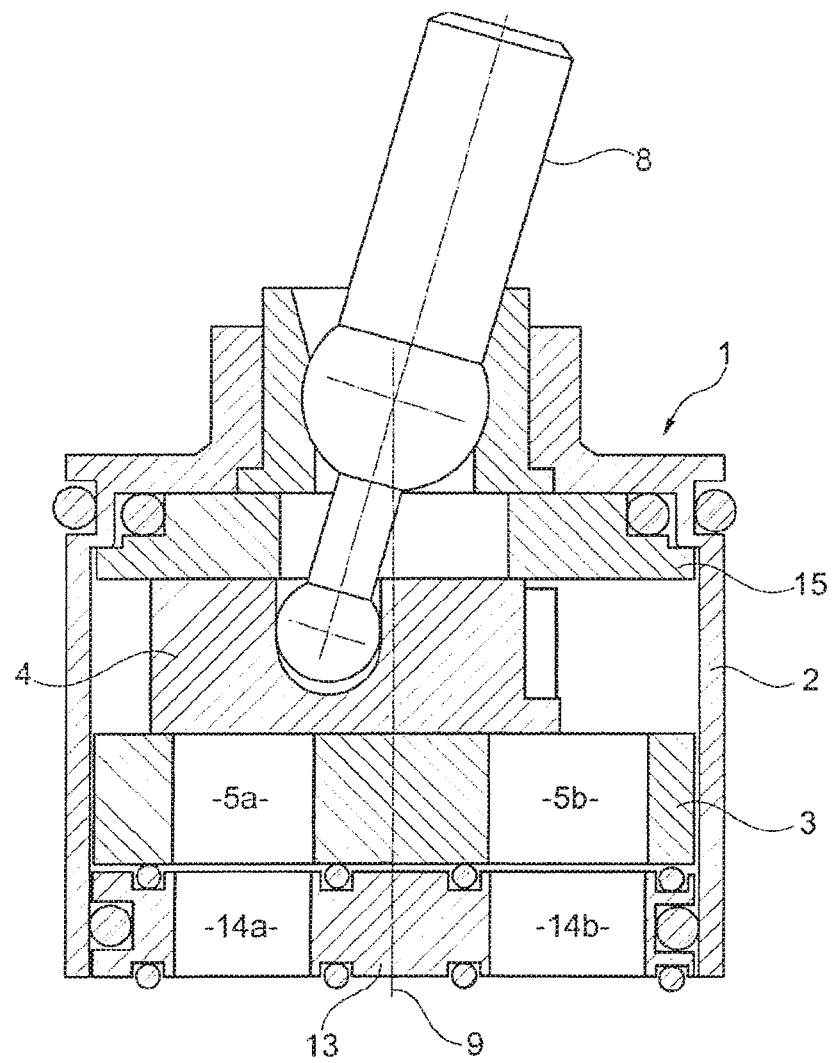
FIG. 8 shows a sectional view of a control cartridge according to the invention.

The valve or the control cartridge having scalding protection is advantageously designed as follows:

FIG. 8 shows a control cartridge 1 according to the invention. A base disk 3 made of ceramic, which is sealed off with respect to the cylinder wall of the housing 2, is situated in a plastic cylindrical housing 2. Three boreholes, one for the cold inlet 5a, one for the hot inlet 5b, and a borehole as the outlet 6 for the mixed water, are situated in the base disk 3. The base disk 3 is secured against rotation with respect to the cylindrical housing 2. The housing 2 and the base disk 3 thus form a unit that is similar to a cylindrical cup. The two inlets 5a, 5b are connected in a water-tight manner to the water supply network via a fitting body (not shown). The mixed water borehole, i.e., the outlet 6, is connected to a fitting, for example the outlet of a shower fitting.

Figure 1:
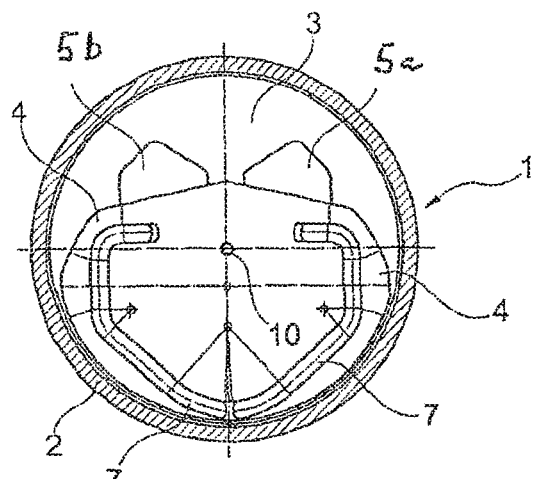

An additional disk made of ceramic, the control disk 4 is situated above the base disk 3. This control disk 4 may be moved translationally as well as rotationally via the pivot 8. The control disk 4 may be turned to the left and the right about the center axis 9 of the cylindrical housing 2 at an angle (pivot point 9). In addition, the control disk 4 may be translationally displaced in the direction of its axis of symmetry. In the illustrated version (see FIG. 1) this distance is 5 mm. The control disk 4 increases or decreases the cross sections of the inlets 5a, 5b and their inlet boreholes due to its translational and rotational movement. In FIG. 1 this valve is schematically illustrated in the fully open position. The hot and cold inlets 5a, 5b are opened to the greatest extent possible, so that the highest volumetric flow results at this position. FIGS. 1, 3, 4, 5, 6 each show a section perpendicular to the center axis 9 (see FIG. 8) of the control cartridge, i.e., a top view of the control disk 4.

Figure 2:
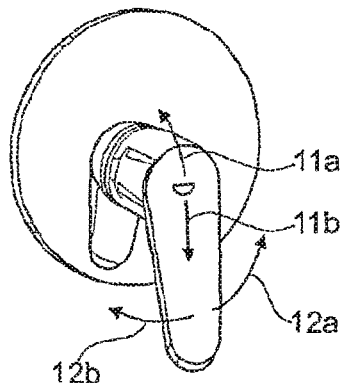
FIG. 2 illustrates movements by operation of a single-lever mixer tap on a shower fitting by the way of example.

These movements are generally known from the operation of a single-lever mixer tap in the bathroom or kitchen. The control disk is translationally moved by the up/down motion of the handle, and is rotationally moved by a rotary motion. FIG. 2 illustrates these movements on a shower fitting by way of example. The arrows 11a, 11b indicate the up and down positions, and the arrows 12a, 12b indicate cold and hot. The same applies for all other single-lever mixer taps in the kitchen or on a wash basin, for example.

Figure 3:
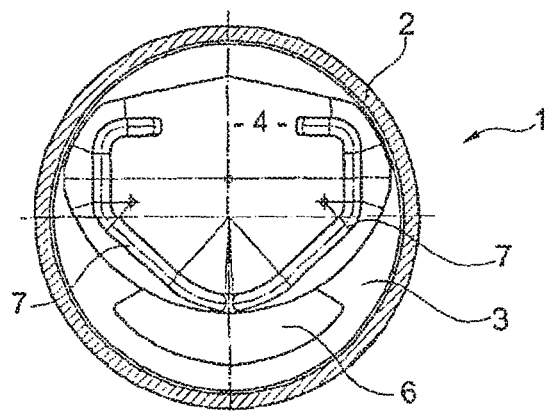

According to the invention, two shape memory alloy (SMA) elements 7a, 7b are inserted into the control disk 4 in a form-fit manner (see FIG. 3). The SMA elements 7a, 7b are made of a shape memory alloy (nickel-titanium alloy), and have the property of deforming at a certain, definable temperature. In everyday operation, these SMA elements 7a, 7b have no function, and take part in the movements of the control disk 4, and mixed water flows around them when the valve is open.

In one preferred embodiment, these SMA elements 7a, 7b are metal sheets or wires.

The valve is illustrated in the closed position in FIG. 3. The inlets 5a, 5b and their inlet boreholes are now concealed by the control disk 4. In the housing 2, water (and also the SMA elements 7a, 7b) take on or have already taken on the surrounding temperature when the valve has been closed for a fairly long time.

Figure 4:
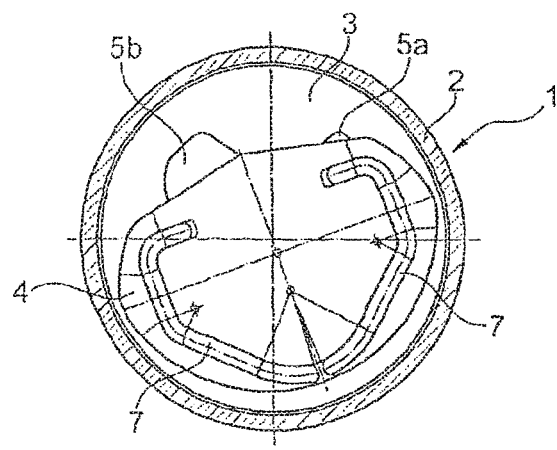

FIG. 4 shows a valve position which may be typical for showering or hand washing. The valve is ¾ opened and turned by 20° into the hot position. The temperature of the mixed water is now a comfortable 38° C. This position and a countless number of intermediate positions take place during the product life cycle; estimates range from 4 to 6 million movements. In tests by the applicant on its endurance test stands, 500,000 load changes were tested, corresponding to approximately 4.5 million movements.

Figure 5:
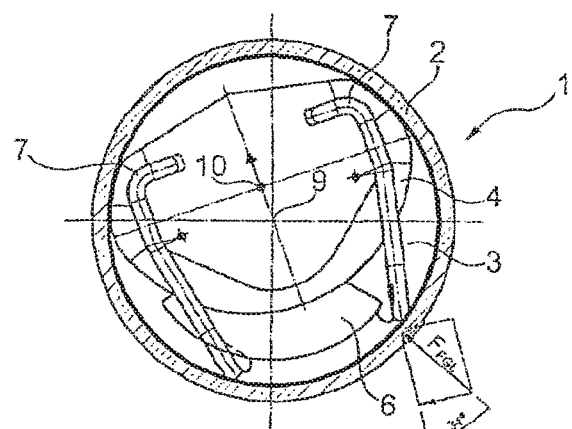

If the cold water feed is throttled or fails altogether, the mixed water temperature may increase to values that result in scalding of the user. Now (and only now) do the SMA elements 7a, 7b perform their function. Above a certain temperature of the mixed water (46° C., for example), the SMA elements 7a, 7b are designed to take on a shape as illustrated in FIG. 5. The control disk 4 is displaced in the direction of its axis of symmetry due to the deformation of the SMA elements 7a, 7b (see arrow direction in FIG. 5). The valve is now closed and prevents further feed of both cold water and hot water.

It is presumed that friction forces of approximately 80 N are to be expected between the base disk 3 and the control disk 4 and the lever mechanism, not illustrated. The SMA elements 7a, 7b must apply this force. There is a concern that a portion of the force for friction between the SMA elements 7a, 7b and the housing 2 may be "lost." In addition, toward the end of the transformation, only 83% of the force is conducted in the translation direction (cos 34°, see FIG. 5). At the beginning of the translation this force is virtually 100%, which certainly meets the performance of the transformation process. At the beginning of the transformation this force is quick and strong, but toward the end it is somewhat slower and weaker. When all these circumstances are taken into account, it is concluded that each of the two SMA elements 7a, 7b must apply at least 50 N.

This force is greatly dependent on the normal force of the slide pairing and/or of the ceramic/ceramic tribological system. The lever mechanism has only a minor influence, since slide pairings are selected here with an extremely low coefficient of friction. The force is generally structurally influenceable, although in the system described here this is the case only to a limited extent, since the entire system has been optimized for volumetric flow and hydraulic function, and therefore the normal force is hardly still influenceable. Further optimizations are conceivable only via the coefficient of friction. In addition, there is a concern that for comparable systems the force will increase over time due to degradation of the tribological system. This is particularly true for the present system, since it is a so-called "open system" in which water flows completely around the control disk 4. For this reason, appropriate reserves must be taken into account in order for the system to function even under these conditions.

The transformation process should preferably proceed quickly and without a further increase in the temperature; 1 to 2 seconds are acceptable.

The restoring of the SMA elements 7a, 7b, i.e., the SMA metal sheets, takes place mechanically via the handle of the fitting (FIG. 2). An automatic recovery of the SMA elements 7a, 7b after the water cools is advantageous.

Figure 6:
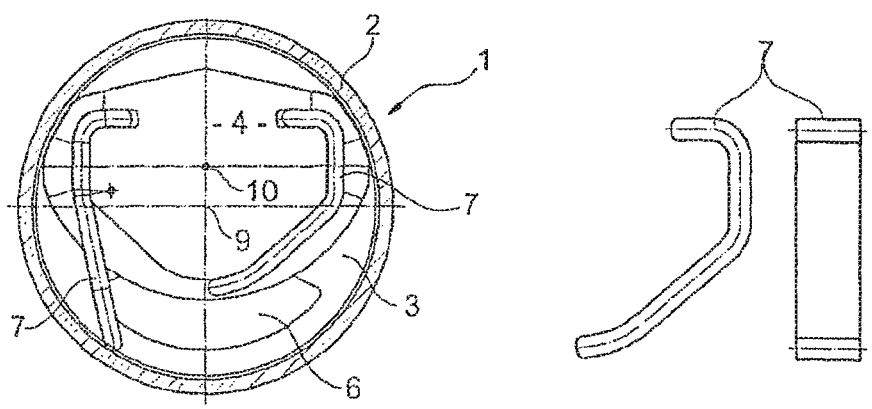
Figure 7:
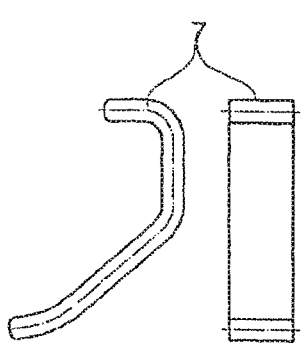
FIG. 7 shows an illustration of an SMA element in the undeformed state in two views.

The SMA elements 7a, 7b are shown in the normal state on the right side of FIG. 6 and in the deformed state on the left side; FIG. 7 shows an illustration of one of the SMA elements 7a, 7b, designed here as a steel sheet, in the undeformed state in two views.

FIG. 8 (also see the description above) shows a control cartridge 1 according to the invention in a cylindrical housing 2 made of plastic. A base 13 having an inlet 14b for hot water and an inlet 14a for cold water, as well as a mixed water outlet (not shown in FIG. 8) are situated in the housing 2. A base disk 3 made of ceramic is situated above the base 13. Three boreholes, one for the cold inlet 5a, one for the hot inlet 5b, and a borehole for the mixed water, are situated in the base disk 3. The base disk 3 is secured against rotation with respect to the cylindrical housing 2. The housing 2 and the base disk 3 thus form a unit that is similar to a cylindrical cup. The two inlets 5a, 5b via the inlets 14a, 14b are connected in a water-tight manner to the water supply network via a fitting body. The mixed water borehole is connected to the outlet of a fitting, for example the outlet of a shower fitting.

An additional disk made of ceramic, the control disk 4 is situated above the base disk 3. Situated on this control disk are the SMA elements 7a, 7b, which move the control disk 4 in the closing direction when they are acted on by hot water, until the control cartridge 1 is closed. The control disk is covered by a bearing disk 15 made of ceramic.

The invention claimed is:

1. A control cartridge for single-lever mixer taps, comprising:
   a housing;
   a ceramic base disk provided in the housing;
   a rotatable and displaceable ceramic control disk resting on the base disk in the housing;
   an inlet for the cold water and hot water, respectively, and an outlet for the mixed water situated in the base disk, whereby the mixed water is diverted in the control disk and leaves the control cartridge via the outlet in the base disk:
   at least one shape memory alloy (SMA) element situated on the control disk and having one end directly supported by the control disk, the at least one SMA element being configured to take on the temperature of the mixed water during operation of the control cartridge, and, upon reaching a predetermined temperature of the mixed water, to expand such that another end of the at least one SMA element is in direct contact with the housing to thereby automatically move the control disk into the closed position in which no water arrives at the outlet.

2. The control cartridge according to claim 1, wherein the SMA element is situated on the side of the control disk facing away from the base disk.

3. The control cartridge according to claim 1, wherein the at least one SMA element is an SMA metal sheet or an SMA wire.

4. The control cartridge according to claim 1, wherein the at least one SMA element is configured to expand with a force of at least 50 N when the predetermined temperature is reached.

5. The control cartridge according to claim 1, wherein two or more SMA elements are used.

6. The control cartridge according to claim 1, wherein two or more identical SMA elements are used.

7. The control cartridge according to claim 1, wherein the at least one SMA element is configured to apply a force sufficient to overcome friction forces expected between the base disk and the control disk and a lever mechanism upon reaching a predetermined temperature of the mixed water.

8. The control cartridge according to claim 1, wherein two identical SMA elements are used and, upon reaching a predetermined temperature of the mixed water, each of the two SMA elements applies a force of at least 50 N.

* * * * *